United States Patent [19]

Gibbons et al.

[11] Patent Number: 4,974,941
[45] Date of Patent: Dec. 4, 1990

[54] PROCESS OF ALIGNING AND REALIGNING LIQUID CRYSTAL MEDIA

[75] Inventors: Wayne M. Gibbons, Newark; Shao-Tang Sun, Hockessin; Brian J. Swetlin, Wilmington, all of Del.

[73] Assignee: Hercules Incorporated, Wilmington, Del.

[21] Appl. No.: 320,424

[22] Filed: Mar. 8, 1989

[51] Int. Cl.$^5$ ............................................. G02F 1/13
[52] U.S. Cl. .................................. 350/349; 350/341; 350/350 S; 350/351
[58] Field of Search ............... 350/340, 341, 346, 349, 350/350 R, 350 S, 351, 345

[56] References Cited

U.S. PATENT DOCUMENTS

| | | | |
|---|---|---|---|
| 3,836,243 | 9/1974 | Melchior | 350/351 |
| 3,999,838 | 12/1976 | Sprokel | 350/351 |
| 4,040,047 | 8/1977 | Hareng et al. | 350/351 |
| 4,291,949 | 9/1981 | Wada et al. | 350/349 |
| 4,354,740 | 10/1982 | Cole, Jr. | 350/340 |
| 4,472,027 | 9/1984 | Okubo et al. | 350/340 |
| 4,477,151 | 10/1984 | Mash | 350/354 |
| 4,606,613 | 8/1986 | Urabe | 350/349 |
| 4,701,029 | 10/1987 | Crossland et al. | 350/351 |
| 4,775,226 | 10/1988 | Montgomery, Jr. et al. | 350/350 S |
| 4,796,980 | 1/1989 | Kaneko et al. | 350/341 X |
| 4,836,653 | 6/1989 | Yoshino et al. | 350/341 |
| 4,893,907 | 1/1990 | Mallinson | 350/350 S |

FOREIGN PATENT DOCUMENTS

| | | |
|---|---|---|
| 275999 | 7/1988 | European Pat. Off. |
| 153053 | 12/1979 | Japan .............. 350/350 S |
| 217339 | 10/1985 | Japan .............. 350/334 |
| 60-111224A | 6/1988 | Japan . |
| 2200650A | 8/1988 | United Kingdom . |

OTHER PUBLICATIONS

Eich et al., "Reversible Digital and Holographic Optical Storage in Polymeric Liquid Crystals (PLC)", SPIE vol. 682, Molecular and Polymeric Optoelectronic Materials: Fundamentals and Applications (1986).
Reck et al., "Combined Liquid Crystalline Polymers: Mesogens in the Main Chain and as Side Groups" (1985).
Reck et al., "Combined Liquid-Crystalline Polymers: Rigid Rod and Semi-flexible Main Chain Polyesters with Lateral Mesogenic Groups" (1986).
Ringsdorf et al., "Orientational Ordering of Dyes in the Glassy State of Liquid-crystalline Side Group Polymers", *Liquid Crystals* (1986).
Hosoki et al., "Reversible Change in Alignment Mode of Nematic Liquid Crystals Regulated Photochemically by Command Surfaces Modified with an Azobenzene Monolayer", Langmuir (1988).
Coles et al., "Laser and Electric Field Kerr Effect of Liquids and Liquid Crystals", Electro Optics/Laser International '76 UK.
Coles et al., "Laser and Electric Field Induced Kerr Effect Studies on Nematic Liquid Crystals" (Abstract).
Neporent et al., "Reversible Orientation Photodichroism in Viscous Solutions of Complex Organic Substances" (1962).
Neporent et al., "The Orientation Photodiochroism of Viscous Solutions" (1960).
Romanovskis et al., "Photo-orientation of Anisotropically Absorbing Molecules", Nature (1975).

*Primary Examiner*—Stanley D. Miller
*Assistant Examiner*—Huy K. Mai
*Attorney, Agent, or Firm*—Mark D. Kuller

[57] ABSTRACT

A process of aligning or realigning a liquid crystal medium adjacent to a coated or uncoated substrate comprising exposing anisotropically absorbing molecules to linearly polarized light of a wavelength or wavelengths within the absorption band of the anisotropically absorbing molecules, wherein (a) the exposed anisotropically absorbing molecules induce alignment of the liquid crystal medium at an angle + and $-\theta$ with respect to the direction of the linear polarization of the incident light beam and along a surface of the liquid crystal medium and (b) the liquid crystal medium comprises liquid crystals having a molecular weight of less than 1500, and liquid crystal cells and devices prepared by this process, are disclosed.

37 Claims, 3 Drawing Sheets

BEFORE EXPOSURE

AFTER EXPOSURE

BEFORE EXPOSURE

AFTER EXPOSURE

PROCESS OF ALIGNING AND REALIGNING LIQUID CRYSTAL MEDIA

This invention is directed to a process of aligning or realigning a liquid crystal medium comprising exposing anisotropically absorbing molecules to linearly polarized light of a wavelength or wavelengths within the absorption band of the anisotropically absorbing molecules, wherein the exposed anisotropically absorbing molecules induce alignment of the liquid crystal medium, and to liquid crystal cells and devices prepared by this process.

BACKGROUND OF THE INVENTION

Liquid crystal compounds are used in human and machine readable displays finding applications in all types of instrument controls, e.g., in motor vehicles, avionics, medical devices, process control devices; in timing devices, e.g., watches; etc. Display devices are primarily comprised of liquid crystal cells having a glass or other substrate coated with a transparent conductive material in front and behind a liquid crystal medium. Light transmission through these devices is controlled through orientation of the liquid crystal compounds or dyes dissolved therein. That is, a voltage or, in some instances, a magnetic field may be applied to the cell so that the liquid crystals and, where present, dyes (collectively referred to as liquid crystal medium) are oriented in a fashion such that all, some or none of the light is passed through. In addition, depending on the device geometry, one or two polarizers may be used in conjunction with the liquid crystal medium to control light transmission. A composition comprised of one or more liquid crystal compounds having one or more dyes dissolved therein is generally referred to as a "guest-host" system.

Liquid crystal compounds useful in these displays are anisotropic. That is, they (a) exhibit properties with different values when measured along axes in different directions and (b) assume different positions in response to external stimuli, e.g., an applied voltage. More specifically, they are birefringent. An applied voltage can be used to rotate the liquid crystals along a fixed axis so as to alter their optical properties. This phenomenon can be used to modulate light.

Dyes useful in "guest-host" systems are also anisotropic. That is, they exhibit dichroism (have different light absorption characteristics along different axes). Dichroic dyes best suited for displays absorb more light along one axis and absorb less light along a second. When the liquid crystal host composition and guest dye are properly matched, such a dye may be dissolved in the liquid crystal composition and the transmission characteristics of the mixture can be controlled through an applied voltage. The voltage is applied in a manner so as to place the mixture in a position such that only the desired amount of light will be transmitted through the dye.

All aligned liquid crystal cells in commercial use today are oriented in directions suitable for controlling light transmission. That is, the liquid crystal composition or guest-host mixture is aligned so as to assume a homogeneous or homeotropic alignment. Without external stimuli the display will either appear opaque or transparent. By applying an electric field the molecules are rotated along a fixed axis so as to alter the transmission properties in a desired fashion.

Many techniques are known for aligning liquid crystal media. Typically, with homogeneous alignment, the inner surfaces of the glass substrates are coated with an alignment layer, e.g., a polymer film, and the coating is rubbed along a fixed linear direction with a cloth. By rubbing the surface, one preferentially alters the surface state so that generally the "long" molecular axis of the liquid crystal aligns along or relative to the rubbing direction. This alignment is transferred to the bulk of the liquid medium via intermolecular forces.

A homeotropic alignment is characterized by the long axis of the liquid crystal aligning along or relative to an axis perpendicular to the glass substrate. Typical alignment layers, applied to the glass substrate, are comprised of polyalkylsiloxanes and lecithins.

A simple technique for aligning or realigning liquid crystal and guest-host media has been desired. In addition, it has been desired to eliminate the alignment layers used in liquid crystal displays and processes necessitated by their use in order to decrease cost and improve performance of the displays. Further, a liquid crystal cell having two or more regions aligned in different homogeneous or homeotropic alignments has been desired. These objectives can be achieved using linearly polarized light per the claimed invention.

SUMMARY OF THE INVENTION

Accordingly, this invention is a process of aligning or realigning a liquid crystal medium adjacent to a coated or uncoated substrate comprising exposing anisotropically absorbing molecules to linearly polarized light of a wavelength or wavelengths within the absorption band of the anisotropically absorbing molecules, wherein (a) the exposed anisotropically absorbing molecules induce alignment of the liquid crystal medium at an angle $+$ and $-\theta$ with respect to the direction of the linear polarization of the incident light beam and along a surface of the liquid crystal medium and (b) the liquid crystal medium comprises liquid crystals having a molecular weight of less than 1500. This invention is also directed to liquid crystal cells and devices prepared by this process.

DETAILED DESCRIPTION OF THE INVENTION

Figure 1:
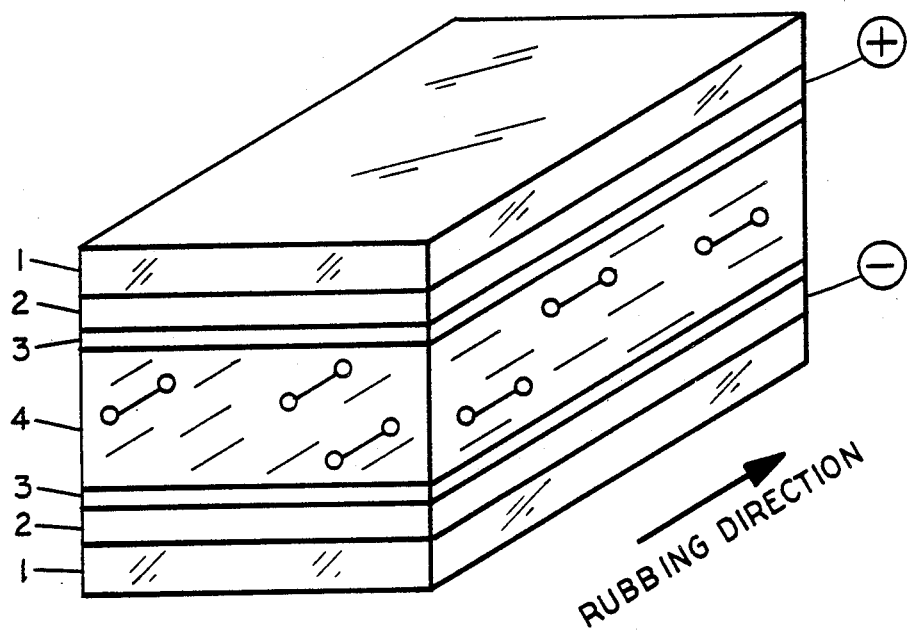
FIG. 1 is a schematic of a typical liquid crystal cell.

By "anisotropically absorbing molecules" reference is made to compounds which exhibit absorption properties with different values when measured along axes in different directions. Preferred are liquid crystal compounds and dichroic dyes useful in liquid crystal displays, and mixtures thereof.

Herein, the term "liquid crystal" is used to refer to molecules with anisotropic geometry, such as rod-shaped or disc-shaped, that exhibit stable states intermediate between liquid and solid, and which have low molecular weights, i.e., less than about 1500, preferably 1000 or less, and most preferably 650 or less. The liquid crystal medium of this invention may contain any such liquid crystal compound useful in liquid crystal devices, e.g., liquid crystal displays, or a mixture of such liquid crystal compounds. Useful are thermotropic liquid crystals which exhibit nematic and smectic (including ferroelectric) phases.

Nematic phases include conventional uniaxial nematics, twisted nematic, and cholesteric mesophases. The nematic liquid crystals can have either positive or negative dielectric anisotropy. As used herein the term "positive" or "negative" refers to the net dielectric anisotropy of a mixture comprising liquid crystals.

Readily available positive nematic liquid crystal materials which are suitable for the practice of this invention include:
cyano-4'-alkylbiphenyls,-4-cyano-4'-alkyloxybiphenyls,
4-alkyl-(4'-cyanophenyl)cyclohexanes,
4-alkyl-(4'-cyanobiphenyl)cyclohexanes,
4-cyanophenyl-4'-alkylbenzoates,
4-cyanophenyl-4'-alkyloxybenzoates,
4-alkyloxyphenyl-4'cyanobenzoates,
4-alkylphenyl-4'cyanobenzoates,
1-(4'-alkylphenyl)-4-alkylpyrimidines,
1-(4'-alkylphenyl)-4-cyanopyrimidines,
1- (4'-alkyloxyphenyl)-4-cyanopyrimidines and
1- (4-cyanophenyl)-4-alkylpyrimidines.

Specific examples of compounds within these families are:
4-cyano-4'-pentylbiphenyl,
4-cyano-4'-hexyloxybiphenyl,
trans-4-pentyl-(4'-cyanophenyl)cyclohexane,
trans-4-hexyl-(4'-cyanobiphenyl)cyclohexane,
4-cyanophenyl-4'-propylbenzoate,
4-pentyloxyphenyl-4'-cyanobenzoate,
4-hexylphenyl-4'-cyanobenzoate,
4-(4'-pentylphenyl)-4-butylpyrimidine,
1-(4'-butyloxyphenyl)-4-cyanopyrimidine,
1-(4-cyanophenyl)-4-alkylpyrimidine,
4-n-hexylbenzylidene-4'-aminobenzonitrile and
4-cyanobenzylidene-4'-octyloxyaniline.

Eutectic mixtures and combinations of all the above are also useful. Illustrative are eutectic mixtures of 4'-alkyl-4-cyanobiphenyls with either 4'-alkyloxy-4-cyanobiphenyls wherein the 4' substituents have 3 to 8 carbons or terphenyl liquid crystals with 4-alkyl or alkyloxy substituents containing 3 to 8 carbon atoms. Representative are the commercially available E7 mixture from BDH, Ltd., Poole, England; ROTN 404, a eutectic mixture of biphenyl pyrimidine liquid crystals from Hoffman La Roche, Nutley, N.J.; PCH 1132, a mixture comprising the 4-alkyl-(4'cyanobiphenyl)cyclohexanes and 4 alkyl-(4'-cyanophenyl)cyclohexanes from EM Industries, Hawthorne, N.Y.; and ZLI 1982, also available from EM Industries.

Representative of nematic liquid crystals having negative dielectric anisotropy that would be useful for this invention include: 4-alkyloxy-4'-alkyloxyazoxybenzenes, 4-alkyl-4'-alkyloxyazoxybenzenes, 4-alkyl-4'-acyloxyazoxybenzenes, 4-alkyl-4'alkylazoxybenzenes and 4-alkyl-2-cyanophenyl-4'-alkylbiphenyl-1-carboxylates.

Specific examples include: p-azoxyanisole, 4-butyl-4'-hexyloxyazoxybenzene, 4-butyl-4'-acetoxyazoxybenzene, 4,4'-bis(hexyl)azoxybenzene, and 4 pentyl-2-cyanophenyl-4'-heptylbiphenyl-1-carboxylate. Commercially available are Licristal S1014 from EM Industries, Hawthorne, N.Y.; and EN-18 from Chisso Corp, Yokomoma Japan.

Smectic A liquid crystals useful in this invention can be of either positive or negative dielectric anisotropy. Smectic A liquid crystals of positive anisotropy include: 4-alkyl-4'-cyanobiphenyls and 4-cyano 4'-alkylbenzylideneanilines, as well as mixtures of 4-alkyl-4"-cyano-p-terphenyls and 4-alkyl-4"-cyanobiphenyls. Also useful are smectic A mixtures derived from electron accepting and electron donating mesogenic cores, for example 4'-alkylphenyl 4-alkylbenzoates and 4'-cyanophenyl-4"-alkyloxybenxoyloxybenzoates. Specific examples of compounds useful as smectic A liquid crystals with positive dielectric anisotropy are: 4-cyano-4'-octylbenzylideneaniline, 4-decyl-4'-cyanobiphenyl, 4-dodecyl-4"-cyano-p-terphenyl, 4'-heptylphenyl-4-butylbenzoate and 4'-cyanophenyl-4"-octyloxybenzoyloxybenzoate. Eutectic mixtures and combinations of all the above smectic A materials are useful. Representative eutectic mixtures and combinations of smectic A liquid crystals are the commercially available materials S1, S2, S3, S4, S5, S6 and S7, from EM Industries, Hawthorne, N.Y.

Representatives of smectic A liquid crystals of negative dielectric anisotropy that are useful in this invention are 4-alkylphenyl-4-alkyloxy-3-cyanobenzoates, 4-alkyloxyphenyl-4-alkyloxy-3-cyanobenzoates and 4"-alkyloxyphenyl-4'-alkyloxybenzoyloxy-3-cyanobenzoates. Specific examples include: 4'-octylphenyl-4-decyloxy-3-cyanobenzoate, 4'-decyloxyphenyl-4-octyloxy-3-cyanobenzoate and 4'-heptyloxyphenyl-4'-decyloxybenzoyl-3-cyanobenzoate. Eutectic mixtures of these may also be used.

Representative chiral smectic C liquid crystals useful in the practice of this invention include: 4'-alkyloxyphenyl-4-alkyloxybenzoates, 4'-alkyloxybiphenyl-4-alkyloxybenzoates, 4-alkyloxyphenyl-4-alkyloxybiphenylcarboxylates and terpenol esters of 4'-n-alkyloxybiphenyl-4-carboxylates. Specific are: 4(4 methylhexyloxy)phenyl-4-decyloxybenzoate, 4-heptyloxyphenyl-4(4-methylhexyloxy)benzoate, 4'-octyloxybiphenyl-4(2-methylbutyloxy)benzoate, 4-nonyloxyphenyl-4'-(2-methylbutyloxy)biphenyl-4-carboxylate, and menthyl 4'-n-octyloxybiphenyl-4-carboxylate. Commercially available mixtures of chiral smectic C liquid crystals include the CS 1000 series offered by Chisso Corp., Yokohoma, Japan; ZLI 4139, available from EM Industries, Hawthorne, N.Y.; and the eutectic mixtures of laterally fluorinated esters developed by BDH, LTD., and available through EM Industries as the SCE series of eutectic mixtures SCE3 through SCE12. Single component chiral smectic C materials based on 4'-alkyloxyphenyl-4-alkyloxybenzoates, W7, W37, W81, and W82 are available from Displaytech, Inc., Boulder, Colo.

Guest-host formulations are prepared with all types of liquid crystals. Dyes useful in these mixtures include dichroic azo, diazo, triazo, tetraazo, pentaazo, anthraquinone, mericyanine, methine, 2-phenylazothiazole, 2-phenylazobenzthiazole, 4,4'-bis(arylazo)stilbenes, perylene and 4,8-diamino-1,5-naphthoquinone and other dyes that exhibit dichroic absorption bands. Preferred are those which exhibit dichroic absorption bands between about 150 nm and about 2000 nm. Some specific examples of dyes useful in this invention are listed in the Table preceding the Examples.

The process of this invention is useful for aligning liquid crystal media used in all types of liquid crystal devices. The best known liquid crystal device is a liquid crystal display. A schematic of a basic liquid crystal cell, which is the active component of such a display, is shown in FIG. 1. This schematic is exemplary and not intended to be limiting.

The liquid crystal cell shown in FIG. 1 contains a guest host liquid crystal medium (4). The host liquid crystal molecules are represented by short lines and the guest dye molecules are represented by lines with circles on each end. In this Figure, the cell comprises two substrates (1) (e.g., glass) each coated with a transparent conductive coating (e.g., indium-tin-oxide) (2). Coated on the conduiting layers are thin films of organic material (3) (e.g., polyimide), which in this case has been rubbed in a linear fashion with a buffing cloth (known as an "aligning layer"). The coated substrates are sandwiched together (aligning layers facing inward) with small glass fibers having diameters of from about 2-20 micrometers (not shown in the Figure) used to control the spacing. The liquid crystal layer (4) is sealed with, for example, epoxy (not shown). The $\oplus$ and $\ominus$ shown in the Figure represent applied voltage (Liquid crystal cells may be operated using AC or DC voltage, and the indicated voltage direction in this Figure is not intended to be limiting.). Increased contrast may be obtained by using two or more of such cells in combination. In that case, substrates can be shared so as to form a so-called "three glass structure".

The light source useful in this invention must be linearly polarized. Further, the linearly polarized light must have a wavelength in the absorption band of the anisotropic medium. Here, reference is made to either the absorption band of, for instance, a liquid crystal, one or more of the liquid crystals in a mixture, one or more liquid crystals or dyes of a guest-host medium, one or more dyes coated on the layer (e.g., the conductive coating or aligning layer) adjacent to the liquid crystal medium or one or more dyes forming part of an organic (e.g., an aligning layer) coated adjacent to the liquid crystal medium. Typically, the light will be in the ultraviolet through infrared range as the dyes and, in some instances, the liquid crystal compounds will have peak absorption in this range. Preferably, the light will have a wavelength within the range of about 150 nm to about 2000 nm. The most preferred source of light is a laser, e.g., an argon, helium neon or helium cadmium laser. With lower power lasers it may be necessary to focus the light beam onto the cell, but generally it is not necessary to focus the light beam.

The process of this invention may be used to align a liquid crystal medium which is in a randomly aligned (isotropic) state or to realign a previously aligned (homogenous or homeotropic) liquid crystal medium. Preferably, the liquid crystal medium is of the type that will align homogeneously. The linearly polarized light is applied to the entire medium that is to be aligned or realigned or to a portion thereof. The light beam may be stationary or rotated. Exposure can be in one step, in bursts or by other methods. Exposure times vary widely with the materials used, etc., and can range from less than one second to over an hour. The anisotropic absorbing and liquid crystal molecules are rotated along a plane at an angle $+$ and $-\theta$ with respect to the direction of the linear polarization of the incident light beam. It should be well understood to those of ordinary skill in the art that reference is being to rotation in two dimensions along a surface of liquid crystal medium. Generally, this plane corresponds to the surface of a substrate of a liquid crystal defined by the substrate at an angle relative to the incident light polarization.

The process of this invention should be carried out with at least one (coated or uncoated) substrate contacting the liquid crystal medium. Generally, the liquid crystal medium will form part of a cell having two such substrates, e.g., as shown in FIG. 1. When an alignment layer is used, rubbing generally improves performance but is not necessary.

An important feature of this invention is that after the process is completed the liquid crystal medium has "memory", i.e., will maintain the alignment which is induced by the linearly polarized light source. The anisotropic medium can, of course, be realigned to the original or a third alignment by the process of this invention. Normally, liquid crystal media (and cell prepared therewith) aligned using the techniques of this invention perform in the same manner as displays aligned using conventional techniques.

The effects of the process of this invention can be observed using polarizers. That is, when white light is applied to a cell having a polarizer one observes that there is a change in the angular position of the maximum dye absorption (or liquid crystal absorption where the light is within the absorption band of the liquid crystal) relative to the background. Where white light is applied to a cell having a polarizer on each side one observes a color change in the exposed region relative to the background which indicates a change in the angular position of the liquid crystal molecules and, thus, a change in the birefringence of the cell. Results are sensitive to the exposure time; intensity, wavelength and direction of the linearly polarized light; sample temperature; liquid crystals(s) and dye(s) used and their concentrations; presence or absence of an aligning layer and, where present, type of aligning layer; location(s), amount(s) and properties of the anisotropically absorbing molecules; etc.

Liquid crystal displays prepared using the process of this invention have conventional display configurations (e.g., two, three or more substrate structures) and may include one or more polarizers, lighting means, reflective layer(s), transflective layer(s), elastomeric connectors and circuit boards as conventionally used in the art.

It is not necesary to use conventional alignment layers in the cells, such as the buffed alignment layers commonly used in the prior art. However, in many instances performance is improved with a buffed or rubbed alignment layer. Other orientation layers and techniques may also be used with this invention.

Figure 3:
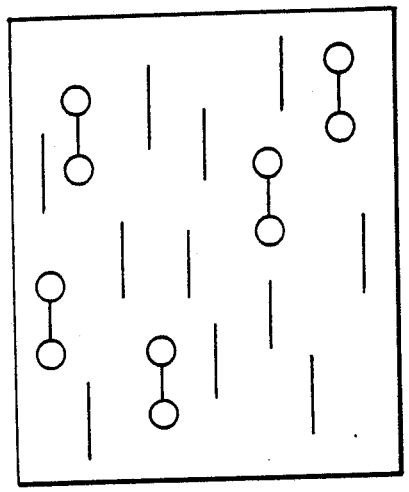
FIG. 3 is a front view of a guest-host liquid crystal medium which has been aligned by rubbing.
Figure 4:
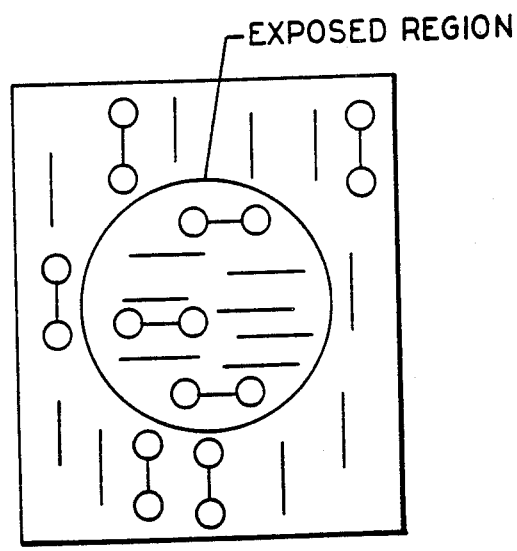
FIG. 4 is a front view of the guest host liquid crystal medium of FIG. 3 after it has been realigned using the process of this invention.

The process of this invention can be used to realign layers or portions thereof which have been previously aligned by a buffed alignment layer of the process of this invention. Most notable is that one or more areas of a liquid crystal device can be aligned in a different orientation than the remainder of the device. Such cells may be prepared by realigning one or more regions of a previously aligned liquid crystal medium. FIG. 3 shows a liquid crystal-host medium which has been aligned in one direction. FIG. 4 shows a region of that medium which has been realigned using the process of this invention. This Figure illustrates the case where the liquid crystal molecules have been rotated 90 degrees to both the incident light polarization and the original alignment direction.

Another interesting feature of this invention is that the process can be carried out by adding the anisotropically absorbing molecules to an organic material coated or otherwise applied adjacent to the liquid crystal medium (e.g., an alignment layer), or coating or otherwise applying them on top of the layer adjacent to the liquid crystal medium (e.g., the alignment or transparent conductive layer) and, then, exposing the anisotropically absorbing molecules. This embodiment can be carried out using a liquid crystal medium that contains anisotropically absorbing molecules or a liquid crystal medium devoid of such molecules. Further, in these embodiments exposure to the linearly polarized light may be at any time prior to or after filling the cell with the liquid crystal medium.

The process of this invention may be carried out in the presence of an electric field (AC or DC). However, it is not necessary that an electric field be present and, in most instances, the process will be carried out in the absence of an electric field.

Generally, this invention is best suited for aligning or realigning homeogeneous liquid crystal systems. In the presence of an electric field, however, homeotropic liquid crystals having negative dielectric anisotropy enter a homogeneous state. That homogeneous system can be aligned or realigned using polarized light per this invention. When the electric field is removed the liquid crystals generally relapse into a homeotropic state. In this case, they will align once more in the homogeneous state induced by the polarized light when an electric field is later applied.

Other conventional materials such as conducting ionic dopants, chiral dopants, photostabilizers and viscosity modifiers, etc., may be used. There is no need for these materials to be present to carry out the process of this invention.

Although this invention is described with respect to cells for liquid crystal displays, it should be understood that it is useful for other liquid crystal devices, e.g., all-optical light modulators, erasable read/write optical data storage media, etc.

This invention is demonstrated in the following examples, which are illustrative and not intended to be limiting, wherein all percentages, are by weight.

The dyes shown in the following Table were used in the Examples.

TABLE

| Dye Number | Structure | Peak Absorption Wavelength in Chloroform (nm) |
|---|---|---|
| 1 | $NH_2-\text{Ph}-N=N-\text{Ph}(CH_3)-N=N-\text{Ph}(OCH_3)-NH-C_4H_9$ | 495 |
| 2 | $NH_2-\text{Ph}-N=N-\text{Ph}(CH_3)-N=N-\text{Ph}(OCH_3)-NH-C_{12}H_{25}$ | 499 |
| 3 | $C_2H_5-NH-\text{Naph}-N=N-\text{Ph}-N=N-\text{Ph}(CH_3)-N=N-\text{Ph}(OCH_3,CH_3)-N=N-\text{Naph}-NH-C_2H_5$ | 570 |
| 4 | 1,4-bis(4-ethylphenylamino)anthraquinone | 540 |
| 5 | $NH_2-\text{Ph}-N=N-\text{Ph}(CH_3)-N=N-\text{Ph}(OCH_3,CH_3)-NH_2$ | 460 |
| 6 | $NH_2-\text{Ph}-N=N-\text{Ph}(CH_3)-N=N-\text{Ph}(OCH_3)-NH-C_6H_{13}$ | 499 |

Example 1

This example shows realignment of a guest-host system comprising a diazodiamine dye dissolved in a nematic liquid crystal using the process of this invention.

The host nematic liquid crystal was ZLI 1982 (EM Industries, Hawthorne, N.Y.). 0.38 weight %, based on the weight of the liquid crystal, of Dye 1 was dissolved in the host.

A 25 weight % solution of polyimide in 1-methyl-2-pyrrolidinone (NMP) was diluted with reagent grade NMP to a final polyimide concentration of 0.5 weight This solution was placed on top of an indium tin oxide (ITO) coated side of a glass substrate and allowed to sit for 5 minutes, after which the glass substrate was spun for 30 seconds. The substrate was heated in an oven to cure the coating and, then, the cured coating was rubbed in a linear direction with a buffing cloth. Next, 11 micron glass fibers were placed on one piece of the coated glass substrate and another coated glass substrate was sandwiched on top of it (the coatings were on the inside of the resultant cell). The two pieces were pressed to an 11 micron spacing using clamps, epoxy was applied along the edges and the epoxy was cured for 5 minutes. Two spaces on opposite edges of the cell were left unsealed.

The cell was placed in a vacuum and one unsealed space was dipped into the guest-host mixture. The cell filled by capillary action. After filling, the cell was removed from the vacuum and wiped clean, and the unsealed spaces were sealed with epoxy. The rubbed polyimide caused the guest host material to align along the rubbing direction.

Figure 2:
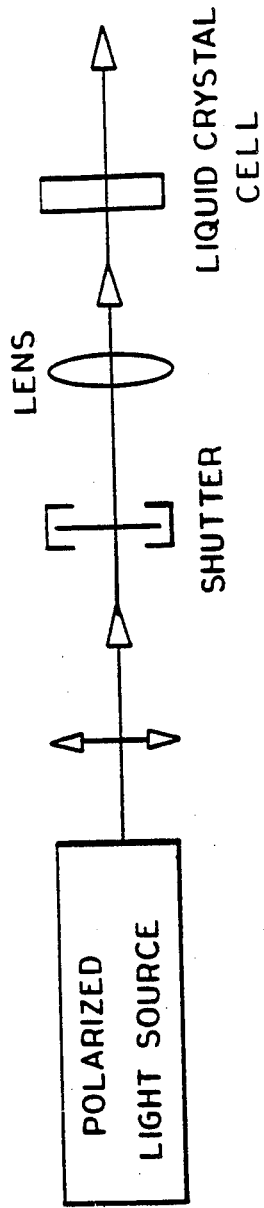
FIG. 2 shows an apparatus useful for aligning or realigning liquid crystal media.

An apparatus as shown in FIG. 2, without the optical lens, was used to realign the guest-host medium. The polarized light source was an argon laser (Model No. 2020-03, Spectra-Physics, Piscataway, N.J.) having a maximum power of approximately 1.2 watts at 514.5 nm wavelength. The laser was polarized vertically, as indicated by the two headed arrow in FIG. 2. The laser light was incident on a variable camera shutter to control the exposure time on the sample. The shutter was set for manual control because of the longer exposure times required for realignment. When the shutter was opened, a laser light beam of 4 mm diameter passed through. The laser beam was incident perpendicular to the plane of the glass substrate as indicated in FIG. 2.

FIGS. 3 and 4 show an expanded front view of the cell before and after exposure with the polarized light beam. Prior to exposure, the incident light polarization (represented by two headed arrow) was parallel to the rubbing direction of the polyimide surface and, thus, the long axis of the dye (represented by line with a circle on each end) and liquid crystal molecules (represented by a line). After exposure, the dye and liquid crystal molecules in some domains were found to have rotated an angle $+\theta$ in the plane defined by the cell substrate and relative to the incident light polarization. In other domains, the dye and liquid crystal molecules had rotated an angle $-\theta$ in the plane defined by the cell substrate and relative to the incident light polarization. (In all subsequent references to the angle of rotation it will be understood that the rotation is in the plane defined by the cell substrate). When the magnitude of $\theta$ equals ninety degrees, the two domains degenerate into one domain (i.e., all liquid crystals align in one direction), with alignment perpendicular to the incident light polarization. For any value $+$ or $-\theta$ other than zero, one observes with a single polarizer that there is a change in the angular position of the maximum dye absorption relative to the background. Also, by using two polarizers (one on each side of the cell) one observes a color change in the exposed region relative to background which indicates a change in the angular position of the liquid crystal molecule.

In this example, using a laser power of 1.2 Watts at 514.5 nm and an exposure time of 45 minutes, the magnitude of $+$ and $-\theta$ was observed to be approximately 45 degrees.

Example 2

This example demonstrates that liquid crystals (without dye) can be realigned using the process of this invention if the polarized light is within the absorption band of a liquid crystal compound.

The liquid crystal was ZLI4139 (EM Industries, Incorporated, Hawthorne, N.Y.) which is a ferroelectric liquid crystal (exhibits a room temperature chiral smectic C phase). ZLI4139 shows a strong absorption band in the ultraviolet region. No dye was added to the liquid crystal. A cell was fabricated as in Example 1, except that Pyrex microscope slides (available from VWR Scientific, San Francisco, Calif.) without ITO coatings were used to ensure low absorption in the ultraviolet and 5 micrometer fibers were used to provide the spacing. The cell was filled using capillary action at 130° C.

An arrangement as in FIG. 2 without the lens, was used to expose the completed cell. The light source was a polarized Helium Cadmium laser, available from Liconix, Sunnyvale, Calif., which emits a wavelength of 325 nm. The beam diameter was approximately 1 millimeter and the laser power was approximately 1.0 milliwatt. The cell was exposed for 1 minute and inspected. The angular position of the liquid crystal molecules in the exposed region was different from the background position. Since the absorption of the laser light was significant, the molecules on the entrance side of the cell changed orientation relative to the incident light polarization but the molecules on the exit side of the cell were unaffected (i.e., the light was absorbed and did not penetrate the liquid crystal medium so as to expose the molecules on the rear side of the cell). A twisted alignment of the liquid crystal in the cell resulted.

Example 3

This example demonstrates realignment per this invention of a guest-host system using polarized light having a wavelength within the absorption band of the liquid crystal.

A cell was fabricated and filled as in Example 2, except using 0.6 weight %, based on the weight of the liquid crystal, of Dye 2 dissolved in the host liquid crystal.

An arrangement as in FIG. 2 (without the lens) was used to expose the completed cell. The light source was a polarized Helium Cadmium laser as described in Example 2. The cell was exposed for 15 minutes and inspected. The dichroism of the illuminated region was different from the background dichroism. The angle of rotation was approximately 30 degrees to the incident light polarization. Since the absorption of the polarized light was significant, the molecules on the entrance side of the cell changed orientation relative to the incident light polarization but the molecules on the exit side of the cell were unaffected. A twisted alignment of the liquid crystal and dye molecules in the cell resulted.

Example 4

This example demonstrates that guest-host systems can be realigned using polarized white light.

A cell was fabricated and filled as in Example 3.

An Olympus BH-2 polarization microscope (Olympus Optical Company, Tokyo, Japan) was used to expose the completed cell. The microscope uses a xenon lamp to generate white light which is then passed through a polarizer. Exposure of the cell for 2 hours at room temperature did not cause realignment. However, by using a Mettler FP52 temperature stage and FP5 temperature controller (Mettler Instrument Corporation, Princeton, N.J.) the cell was ramped 10 degrees centigrade per minute (°C./minute) from room temperature (25° C.) to 100° C. (The isotropic transition temperature of ZLI4139 is 82° C). The cell was exposed with the white light polarized along the initial alignment direction of the liquid crystal at room temperature. During exposure the temperature of the cell was cooled at a rate of 1° C./minute from 100° C. to room temperature. The exposed region was found to align approximately + and −30 degrees from the incident light polarization.

Example 5

Example 1 was repeated using a higher concentration of Dye 1, demonstrating that with higher concentrations of dye lower energy requirements (shorter exposure times) are required to achieve realignment.

The cell was fabricated and filled as in Example 1, except using 7.0 weight %, based on the weight of the liquid crystal, of Dye 1.

Realignment was carried out as in Example 1. The magnitude of + and −θ was 90 degrees relative to the incident polarization after an exposure time of 20 minutes. The magnitude of + and −θ did not increase beyond 90 degrees when the exposure time was increased beyond 20 minutes.

Example 6

Example 1 was repeated using a different azo dye in the nematic liquid crystal host.

The cell was fabricated and filled as in Example 1, except using 1.25 weight %, based on the weight of the liquid crystal, of Dye 3 dissolved in the host nematic liquid crystals.

Realignment was carried out as in Example 1. The magnitude of + and −θ was 90 degrees relative to the incident light polarization after an exposure time of 45 minutes.

Example 7

Example 1 was repeated using an anthraquinone dye in the nematic liquid crystal host.

The cell was fabricated and filled as in Example 1, except using 1.5 weight %, based on the weight of the liquid crystal, of Dye 4 dissolved in the nematic liquid crystal host.

Realignment was carried out as in Example 1. The magnitude of + and −θ was approximately 45 degrees relative to the incident light polarization after an exposure time of 45 minutes.

Example 8

Example 1 was repeated without the polyimide aligning layer.

The cell was fabricated and filled as in Example 1 except that a polyimide layer was not coated onto the ITO coated glass substrate (thus, the surfaces were not rubbed) and 10 micrometer fibers were used instead of 11 micrometer fibers. In addition, 0.28 weight %, based on the weight of the liquid crystal, of Dye 5 was dissolved in the host in place of Dye 1.

Alignment was carried out using a laser as in Example 1. The magnitude of + and −θ was approximately 30 degrees relative to the incident light polarization after an exposure time of 80 minutes. The uniformity of the alignment across the exposed region was acceptable, but not as good as with a rubbed polyimide aligning layer.

Example 9

This example shows laser realignment of a guest-host liquid crystal system previously realigned per the process of this invention.

The cell was fabricated and filled as in Example 1, except using 2.0 weight %, based on the weight of the liquid crystal, of Dye 1.

The first realignment was carried out as in Example 1. The magnitude of + and −θ was approximately 90 degrees relative to the incident light polarization after an exposure time of 5 minutes. Subsequently, the cell was rotated by 30 degrees (in the plane perpendicular to the incident laser beam) and exposed for 5 minutes in the same spot that was exposed previously. It was observed that the dye and liquid crystal molecules had rotated + and −90 degrees to the incident light polarization, which was approximately 30 degrees relative to the previously realigned direction.

Example 10

This example shows alignment of a guest-host liquid crystal medium wherein a dye was incorporated into the polyimide aligning layers of the cell.

A cell was fabricated as in Example 1 except that 1 weight %, based on the weight of the NMP, of Dye 5 was added to the 0.5 weight % of polyimide in NMP. This mixture was spun onto the ITO coated substrate and curing was carried out as in Example 1.

Before the cell was filled with the guest-host mixture described in Cell Fabrication, it was exposed with a system as described in FIG. 2 (without the lens) using the laser described in Example 1. The incident light polarization was parallel to the linear rubbing direction of the cell. After an exposure for 15 seconds with 1.2 Watts laser power at 514.5 nm, the cell was filled with the guest-host mixture using the procedure described in Example 1, except 0.28 weight %, based on the weight of the liquid crystal, of Dye 5 (structure in Table 1) was dissolved in the host nematic liquid crystal. The exposed region showed a + and −90 degree rotation from the incident laser polarization. The exposed regions of the cell aligned along the rubbing direction. By localizing the dye in the polyimide aligning layer, the exposure times required to cause the laser induced alignment were significantly reduced compared to that observed in previous Examples.

Example 11

This example shows alignment of a liquid crystal medium per this invention when a dye was incorporated into the polyimide aligning layers of the cell.

A cell was fabricated and aligned as in Example 10, except no dye was mixed in with the liquid crystal. The exposed region showed a + and −90 degree rotation from the incident light polarization. The liquid crystal molecules in the unexposed regions of the cell aligned along the rubbing direction.

Example 12

This example shows alignment of a guest-host system in the case where a dye was incorporated into the unrubbed polyimide aligning layers of the cell.

A cell was fabricated and aligned as in Example 10, except the cured polyimide/dye aligning layer was not rubbed. The exposed region showed a + and −90 degree rotation from the incident light polarization with uniformity as good as that of the cells aligned in Examples 10 and 11. The unexposed regions of the cell aligned along the flow direction while filling.

Example 13

This example shows alignment of a liquid crystal in the case where a dye was incorporated into the unrubbed polyimide aligning layers of the cell.

A cell was fabricated and aligned as in Example 12, except that no dye was dissolved in the nematic liquid crystal. Results were as in Example 12.

Example 14

This example shows realignment of a cell previously aligned per the process of this invention where the aligning layer was comprised of a polyimide and dye mixture.

A cell was fabricated and aligned as in Example 10, except the cured polyimide/dye aligning layer was not rubbed and the cell was exposed with a beam expanded by the lens for 5 minutes. Prior to filling the cell with the guest-host mixture (a) the beam was masked so that the beam size was smaller than the area of the beam used in the initial exposure, (b) the cell was rotated approximately 45 degrees in the plane perpendicular to the incident light beam, and (c) the cell was subsequently exposed for 5 minutes within the area previously exposed. The cell was then filled with the guest-host mixture using the procedure described in Example 1. The initially exposed region (the region which was exposed only once) showed a + and −90 degree rotation from the incident light polarization of the first exposure and the reexposed region (the region which was exposed twice) had a + and −90 degree rotation relative to the direction of the incident light polarization of the second exposure. The alignment of the overlapping regions was as good as the cells in Examples 10 and 11. The unexposed regions of the cell aligned along the flow direction as the cell filled.

Example 15

This example shows laser alignment of a guest-host system in the case when a dye is placed directly onto the transparent conductive coating on the glass substrates.

A cell was fabricated as in Example 1 except that no polyimide was spun onto the ITO coated glass substrate. Instead, 1 weight %, based on the weight of the NMP, of Dye 5 was added to NMP and spun onto the ITO coated glass substrates. The NMP was allowed to evaporate off for 1 hour. This left a thin film of dye molecules lying on top of the ITO layer of the glass substrates. The surface was rubbed with a buffing cloth and 10 micrometer fibers were used to provide the spacing when making the cell.

Before the cell was filled with the guest host liquid crystal mixture described in Cell Fabrication, it was exposed with a system as shown in FIG. 2 (without the lens) using the laser described in Example 1. The incident light polarization was parallel to the linear rubbing direction of the cell After an exposure for 10 seconds with 1.2 Watts laser power at 514.5 nm, the cell was filled with the guest host liquid crystal material using the procedure described in Example 1. The dye on the surface was observed to dissolve into the guest host material while the cell was filling. The exposed region showed a + and −90 degree rotation from the incident light polarization. The unexposed regions of the cell aligned along the rubbing direction.

Example 16

This example demonstrates that a ferroelectric liquid crystal host with a chiral smectic C room temperature phase can be realigned using the process of this invention.

The host liquid crystal was BDH SCE-4 (BDH Limited, Poole, England) which is a ferroelectric liquid crystal. 2.0 weight %, based on the weight of the liquid crystal, of Dye 2 was dissolved in the ferroelectric liquid crystal host. A cell was fabricated and filled as in Example 2.

An arrangement as in FIG. 2 was used to expose the completed cell using the laser described in Example 1. The beam diameter was expanded to 1 centimeter (cm) using the lens. A laser power of 1.0 Watt at 514.5 nm was used to expose the cell for 25 minutes. Since the energy density across the 1 cm laser beam is nonuniform, the angle of rotation relative to the incident light polarization varied across the exposed spot. However, the polarized light did align the spot differently from the alignment in the unexposed regions.

Example 17

This example demonstrates that a liquid crystal host with a smectic A room temperature phase can be realigned using the process of this invention.

The host liquid crystal was BDH S2C (available from BDH Limited, Poole, England) which exhibits a smectic A phase at room temperature. 1.0 weight %, based on the weight of the liquid crystal, of Dye 6 was dissolved in the liquid crystal host. A cell was fabricated as in Example 1 The cell was filled using capillary action at 130° C. and was sealed with epoxy.

Alignment was carried out as in Example 1. A laser power of 0.9 Watts at 514.5 nm was used to expose the cell for 45 minutes. The polarized light realigned the spot approximately + and −90 degrees from the incident laser polarization.

Example 18

This example demonstrates alignment of liquid crystals using the process of this invention where one of the substrates is coated with a polyimide alignment layer containing an anisotropically absorbing dye.

A cell was fabricated as in Example 10 except that the Polyimide/Dye 5/NMP mixture was spun onto one ITO coated substrate and a polyimide/NMP mixture was spun onto the other ITO coated substrate. Curing for both substrates was performed as in Example 1. Both substrates were rubbed in a linear fashion with a buffing cloth and a cell was fabricated as in Example 1, except 10 micrometer fibers were used to control the spacing.

The liquid crystal cell was exposed as in Example 1 using the argon laser as the polarized light source. The cell was exposed for 5 minutes at 0.8 Watts with the incident linear polarization along the linear rubbing direction. Using two polarizers, the exposed region was observed to have a twisted alignment (i.e. the orientation of the liquid crystal molecules at the polyimide/dye substrate was 90 degrees to liquid crystal molecules at the polyimide substrate).

While the invention has been described with respect to specific embodiments, it should be understood that they are not intended to be limiting and that many variations and modifications are possible without departing from the scope of this invention.

What is claimed is:

1. A process of aligning or realigning a liquid crystal medium adjacent to a substrate which process comprises exposing anisotropically absorbing molecules disposed on the substrate, disposed in the liquid crystal medium or which themselves are the liquid crystal medium to linearly polarized light of a wavelength or wavelengths within the absorption band of the anisotropically absorbing molecules, wherein (a) the exposed anisotropically absorbing molecules induce alignment of the liquid crystal medium at an angle $+$ and $-\theta$ with respect to the direction of the linear polarization of the incident light beam and along a surface of the liquid crystal medium and (b) the liquid crystal medium comprises liquid crystals having a molecular weight of less than 1500, and terminating exposure whereby the liquid crystal medium aligned or realigned by the exposure step remains aligned or realigned.

2. The process as claimed in claim 1 wherein the linearly polarized light has a wavelength in the ultraviolet through infrared range.

3. The process as in claim 1 wherein the linearly polarized light has a wavelength between about 150 nm and about 2000 nm.

4. The process as claimed in claim 1 wherein the linearly polarized light is emitted from a laser.

5. The process as claimed in claim 4 wherein the laser light is emitted from an argon, helium neon or helium-cadmium laser.

6. The process of claim 1 wherein the anisotropically absorbing molecules are selected from the group consisting of thermotropic liquid crystal compounds and dichroic dyes which exhibit dichroic absorption bands between about 150 nm and about 2000 nm.

7. The process as in claim 1 wherein the liquid crystal medium contains the anisotropically absorbing molecules.

8. The process as in claim 7 wherein the anisotropically absorbing molecules are thermotropic liquid crystals.

9. The process as claimed in claim 1 wherein the liquid crystal medium comprises at least one thermotropic liquid crystal compound selected from the group consisting of nematic and smectic liquid crystal compounds.

10. The process as claimed in claim 7 wherein the liquid crystal medium comprises at least one thermotropic liquid crystal compound selected from the group consisting of nematic and smectic liquid crystal compounds.

11. The process as claimed in claim 8 wherein the thermotropic liquid crystals are selected from the group consisting of nematic and smectic liquid crystal compounds.

12. The process as claimed in claim 1 wherein the liquid crystal medium comprises at least one thermotropic nematic liquid crystal compound.

13. The process as claimed in claim 1 wherein the liquid crystal medium comprises at least one thermotropic smectic liquid crystal compound.

14. The process as claimed in claim 1 wherein the liquid crystal medium comprises at least one thermotropic ferroelectric liquid crystal compound.

15. The process as claimed in claim 1 wherein the liquid crystal medium comprises at least one dichroic dye which exhibits dichroic absorption between about 150 nm and about 2000 nm dissolved in at least one thermotropic liquid crystal compound.

16. The process as claimed in claim 14 wherein the dichroic dye is selected from the group consisting of azo, diazo, triazo, tetraazo, pentaazo, anthraquinone, mericyanine, methine, 2-phenylazothiazole, 2-phenylazobenzthiazole, 4,4'-bis(arylazo)stilbenes, perylene and 4,8-diamino-1,5-naphthoquinone dyes that exhibit dichroic absorption bands between about 150 nm and about 2000 nm.

17. The process as claimed in claim 15 wherein the anistropically absorbing molecules are one or more of the dichroic dyes.

18. The process as claimed in claim 17 wherein the dichroic dyes are selected from the group consisting of azo, diazo, triazo, tetraazo, pentaazo, anthraquinone, mericyanine, methine, 2-phenylazothiazole, 2-phenylazobenzthiazole, 4,4'-bis(arylazo)stilbenes, perylene and 4,8-diamino-1,5-naphthoquinone dyes that exhibit dichroic absorption bands between about 150 nm and about 2000 nm.

19. The process as claimed in claim 1 wherein the liquid crystal medium does not contain a dichroic dye.

20. The process as claimed in claim 1 which is carried out in the presence of an electric field.

21. The process as claimed in claim 1 which is carried out in the absence of an electric field.

22. The process as claimed in claim 1 which is carried out in the presence of a heat source.

23. The process as claimed in claim 1 which is carried out without an external heat source.

24. The process as claimed in claim 1 further comprising that the liquid crystal medium is filled into a cell comprising a front and rear substrate.

25. The process of claim 24 wherein exposure to linearly polarized light is carried out after the cell is filled.

26. The process of claim 24 wherein at least one of the substances is coated with a rubbed alignment layer.

27. The process of claim 24 wherein the substrates are not coated with an alignment layer.

28. The process as claimed in claim 26 wherein the anisotropically absorbing molecules comprise at least one dichroic dye which exhibit dichroic absorption between about 150 nm and about 2000 nm which is part of the alignment layer.

29. The process as claimed in claim 28 wherein the liquid crystal medium also contains anisotropically absorbing molecules comprising at least one dichroic dye which exhibit dichroic absorption between about 150 nm and about 2000 nm.

30. The process as claimed in claim 1 wherein the liquid crystal medium is aligned into a homogeneous state from an isotropic state.

31. The process as claimed in claim 1 wherein the liquid crystal medium is realigned from one homogeneous state into a different homogeneous state.

32. The process as claimed in claim 20 wherein the liquid crystal medium has a negative dielectric anisotropy and is originally aligned in a homeotropic state.

33. The process as claimed in claim 24 wherein the entire liquid crystal medium in the cell is realigned.

34. The process as claimed in claim 24 wherein one of more sections of the liquid crystal medium in the cell are realigned into a different orientation than another section of the liquid crystal medium.

35. The process as claimed in claim 24 wherein the anisotropically absorbing molecules are selected from the group consisting of dichroic dyes which exhibit dichroic absorption between about 150 nm and about 2000 nm and the dichroic dyes are coated on at least one inner surface of a cell substrate prior to exposure.

36. The process as claimed in claim 1 wherein the liquid crystal medium comprises liquid crystals having a molecular weight of 1000 or less.

37. The process as claimed in claim 1 wherein the liquid crystal medium comprises liquid crystals having a molecular weight of 650 or less.

* * * * *

UNITED STATES PATENT AND TRADEMARK OFFICE
CERTIFICATE OF CORRECTION

PATENT NO. : 4,974,941

DATED : December 4, 1990

INVENTOR(S) : Wayne M. Gibbons; Shao-Tang Sun; and Brian J. Swetlin

It is certified that error appears in the above-identified patent and that said Letters Patent is hereby corrected as shown below:

Col. 3, line 15, "cyano-4'-alkylbiphenyls,-4-cyano-4'-alkyloxybiphenyls," should read -- 4-cyano-4'-alkylbiphenyls, 4-cyano-4'-alkyloxybiphenyls, --;

Col. 5, line 11, "conduiting" should read -- conducting --;

Col. 5, line 64, insert "made" between -- being to --;

Col. 5, line 67, insert "cell" between -- crystal defined --;

Col. 8, line 67, after "0.5 weight" add -- % --;

In the Claims, Col. 15, line 30, "helium neon" should read -- helium-neon --;

Col. 16, line 39, "substances" should read -- substrates --; and

Col. 16, line 63, "of" should read -- or --.

Signed and Sealed this

Thirtieth Day of June, 1992

Attest:

DOUGLAS B. COMER

Attesting Officer

Acting Commissioner of Patents and Trademarks